Sept. 6, 1955

G. STEVENS 2,717,213

PROCESS OF PREPARING A PAPER COATING COMPOSITION

Filed Feb. 10, 1951

INVENTOR.
GILBERT STEVENS

BY H. J. Woodward
attorney

Sept. 6, 1955                G. STEVENS                2,717,213
PROCESS OF PREPARING A PAPER COATING COMPOSITION
Filed Feb. 10, 1951                                2 Sheets-Sheet 2

INVENTOR.
GILBERT STEVENS
BY H. F. Woodward
    attorney

2,717,213

PROCESS OF PREPARING A PAPER COATING COMPOSITION

Gilbert Stevens, Minneapolis, Minn., assignor to Minnesota and Ontario Paper Company, Minneapolis, Minn.

Application February 10, 1951, Serial No. 210,418

5 Claims. (Cl. 106—214)

The invention provides a new process for preparing coating compositions.

The coating composition generally used for coating fibrous sheets or webs, such as paper, consists essentially of a pigment such as clay, calcium carbonate, titanium dioxide, calcium sulfate and barium sulfate, plus an adhesive such as starch or protein.

In the usual preparation of coating compositions, the mineral or pigment suspensions are mixed with separately-prepared adhesives.

In accordance with the process, a coating composition is prepared by forming a suspension of pigment having incorporated therein native starch, subjecting the suspension to high shearing and centrifugal force, and then subjecting the resulting material to action of an amylolytic enzyme. In accordance with the invention a coating composition is prepared by forming an aqueous suspension of pigment and starch, thoroughly blending the suspension, raising the temperature and incorporating an enzyme and then cooking and/or converting the starch. The coating composition produced by this process in which the heating and conversion of the starch occur in the presence of the pigment appears to have a film of adhesive around each pigment particle. The coating composition, when applied to a web of paper, provides a coating having a higher gloss and a smoother surface and better adherence to the paper.

Industrial enzymes are available which fill all the requirements for the conversion of starch for coating. The enzyme used in effecting the conversion of starch is advantageously a liquefying enzyme as distinguished from a saccharizing enzyme. This type of modification of native starch has the effect of lowering viscosity because of the splitting of glucosidic linkage of the starch molecules.

Corn starch, for example, which gelatinizes at a higher temperature than tapioca or other root starch, requires an enzyme which is active at higher temperatures than is required for tapioca. The amount of enzyme depends upon several factors, but for most types of coating, enzyme from about .34% to about 1% is used based upon the weight of the dry corn starch and for tapioca starch about .19% to about .6%.

In preparing the new coating composition, the desired proportions of pigment and starch are thoroughly blended, dispersed and heated. The pH of the mixture should be about 6.5 to about 8.5 at the time of the addition of the enzyme.

It is to be understood that before the enzyme is introduced, the starch and pigment should be thoroughly mixed. The thoroughly mixed pigment and starch should be raised quickly and uniformly to a temperature just prior to the point where definite thickening occurs. For corn starch, this temperature is about 140° to about 158° F., and for tapioca about 135° F. to about 140° F. After the introduction of the enzyme the composition is heated to quickly cook and/or convert the starch. The cooking and conversion is accomplished in less than about three minutes. The material being heated is in a confined thin film which is agitated during the time heat is applied. The cooking and conversion temperature varies with the type of starch used. For corn starch the temperature generally falls within the range of about 160° F. to about 195° F.

The enzyme may be inactivated by raising the temperature up to about 210° F., depending upon the kind of enzyme employed. It is to be understood that the enzyme may be inactivated or its activity retarded by the addition of chemicals such as copper sulfate, sodium phosphate, sodium chlorite, etc. Even if the enzyme is inactivated by the use of chemicals it is desirable to raise the temperature to about 190° F. to about 210° F., as this improves the coating composition. For certain purposes and uses the enzyme may be inactivated and a wet rub resisting coating obtained by introduction of additives such as melamine, di-methylol urea, urea, urea-formaldehyde and formaldehyde. The amount required depends upon the results desired, but generally the amount falls within the range of about 5% to about 30%.

Other and further objects of the invention and the advantages of the same will be pointed out hereinafter and indicated in the appended claims or will be obvious to one skilled in the art upon the understanding of the present disclosure.

Figure 1:
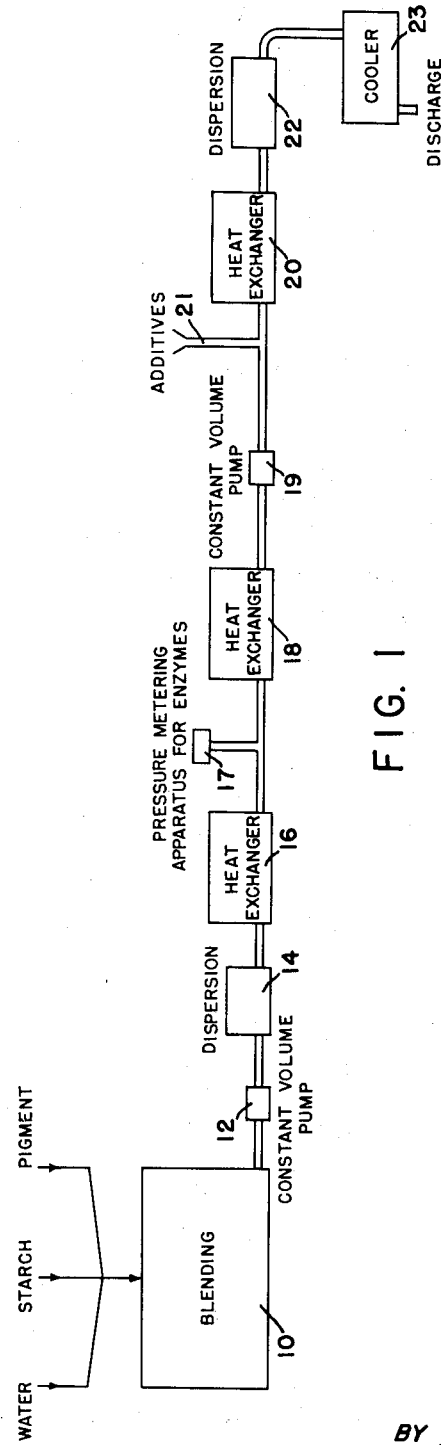
Figure 1 is a schematic arrangement of the steps and apparatus for carrying out the process.

The method and apparatus will be described in the preparation of paper coating composition. Reference being had to Figure 1, the ingredients, such as pigment, starch and water are introduced into a blending apparatus such as a Z-Bar mixer 10. It being understood that in one method of carrying out the process a jacketed Z-Bar mixer is used. If a dispersing agent for the clay, such as tetra-sodium-pyrophosphate is to be used, it is added with the other materials to the Z-Bar mixer. Generally a small amount of protein for the purpose of satisfying the protein demand of the clay is added so that less enzyme will be required. The material from the blending apparatus is flown to a dispersing apparatus 14 under the influence of a constant volume pump 12. After the material is dispersed it is transferred to a heat exchanger 16 where the temperature is raised to bring the starch of the composition to almost the jell point, or stated in another way, the temperature is applied until the composition starts to thicken or jell.

The heated material flowing from the exchanger has introduced therein a suitable amount of enzyme by means of a pressure metering apparatus 17. The heated material after the introduction of the enzyme, flows through a heat exchanger 18 where the temperature is raised to convert and/or cook the starch in the composition. The material from the exchanger 18 under influence of the constant volume pump 19 passes to a heat exchanger 20 where the temperature is elevated to the point sufficient to inactivate the enzyme. The heater 20 may or may not be used if the enzyme is chemically inactivated, depending upon the results desired. It is desirable where di-methylol urea and similar acting chemicals are added to coating composition to thoroughly mix the chemicals by means of a dispersing apparatus 22. The composition should have the temperature lowered in a suitable cooler 23.

Figure 2:
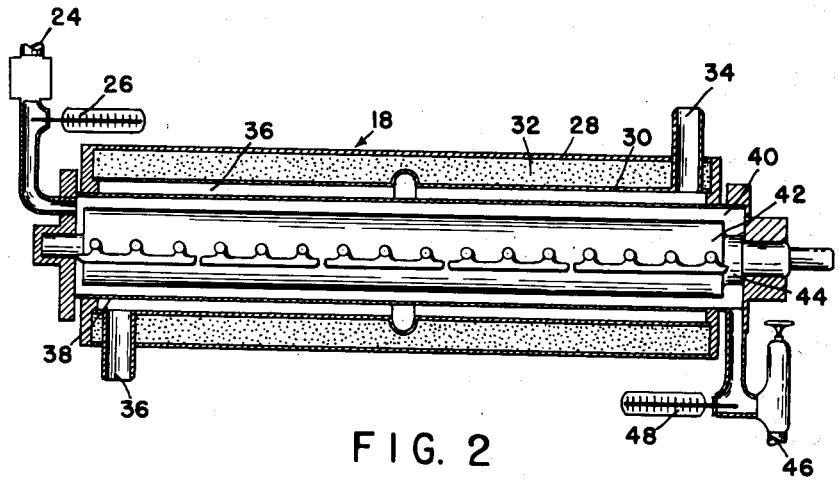
Figure 2 is a longitudinal sectional view through a heat exchanger or cooking apparatus.

Referring to Figure 2, there is shown a preferred form of heat exchanger or cooker. The cooker or heat exchanger 18 has insulating material 32 confined in a jacket formed by walls 28 and 30. This jacket surrounds the heat transfer member or tube 38 in such a manner as to provide a space 36 for a heating medium. The tube 38 preferably has a very thin wall so as to quickly transfer the heat. A shaft 42 is supported in end members and is driven by any desired means (not shown). The portion of the shaft lying within the tube 38 is enlarged in diameter so that an annular confined space is provided. The material enters through conduit 24 and travels in a thin annular layer through the annular confined space and is discharged through conduit 46. The shaft 42 is provided with a series of spaced scrapers or blades 44. The shaft 42 is rotated rapidly and the film formed on the surface 38 is removed by blades 44 almost as rapidly as formed and the material of the film is violently agitated and mixed with the other materials in the annular space. Thus, all the material is quickly and uniformly brought to the required temperature. The shaft 42 is generally rotated at about 400 to 600 R. P. M. or higher and with this type of apparatus it is possible to obtain a high overall efficiency of heat transfer.

Figure 3:
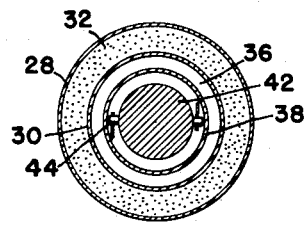
Figure 3 is a cross-sectional view of the heat exchanger or cooking apparatus.

The cooler 23 preferably is of a form and construction similar to that of the heat exchanger shown in Figures 2 and 3. The cooling should be at such rate that the starch of the coating composition shall substantially maintain the state of gelatinization obtained in the conversion heater. The rate of cooling has an effect on the results obtained. Generally, the most rapid rate of cooling which can be obtained is desirable with agitation during cooling to prevent retrogration of the adhesive during cooling.

It is to be understood that the process of preparing coating compositions in which the starch is enzyme converted in the presence of the pigment may be carried out by mixing and blending the pigment-starch-water, etc., raising the temperature of the mixture of composition to just below the point where definite thickening or jelling of the adhesive begins, adding of the enzyme, and then raising the temperature to convert the starch of the composition, and then inactivating the enzyme.

Figure 4:
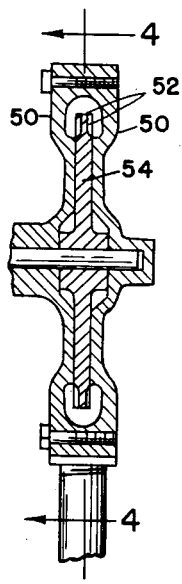
Figure 4 is a cross-sectional view of the dispersing apparatus.
Figure 5:
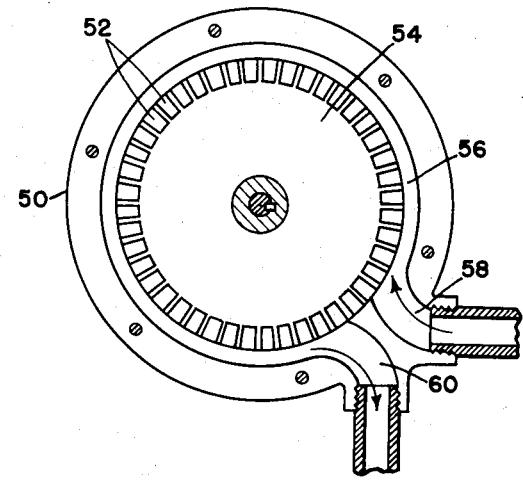
Figure 5 is a sectional view of the dispersing apparatus.

The dispersion apparatus 14 and 22 include a casing 50 as shown in Figure 4 and consist of two sections. The casing has a channel 56 extending therearound and in the casing the edge of the impeller 54 runs. The impeller edge which runs in the channel 56 has pockets which are defined by walls 52. The impeller 54 has a hub through which passes a shaft rotating the impeller 54. The shaft is driven by any suitable means such as electric motor (not shown). The peripheral speed of the impeller must be relatively fast, for example, 3,000 feet per minute to about 6,000 feet per minute.

The mixing or dispersing apparatus consists of a housing and a high speed rotor. There are special radial grooves cut into each side of the rotor at the periphery. These grooves serve two purposes: first, to carry the suspension around in the housing; and second, to throw it out radially from the periphery of the rotor. As the liquid is thrown out radially from the periphery of the rotor, it contacts the housing, is circulated back to the rotor, where it is again taken up by the flutes or grooves and thrown out by centrifugal force. Thus, there is a continuous vortex of the liquid at each side of the periphery of the rotor which is in addition to the flow of the suspension in circulating, there is a shearing action in the liquid as that portion within the grooves of the rotor moves much faster than the liquid at each side of these grooves.

Broadly, the process relates to the continuous modification of starch in the presence of pigment to decrease the viscosity of the starch and to provide an improved paper coating composition. The coating composition prepared by the process herein described gives a strong cohesion, starch to starch; strong adhesion starch to paper; a strong adhesion, starch to pigment; an extensive filming out of the starch; and sufficient plasticity not to powder on the calender.

An example of the formula giving high total solids (in excess of 50% solids) contents:

| | Kilograms |
|---|---|
| Water | 5.25 |
| Corn starch | 1.27 |
| Alpha protein | .07 |
| Clay | 8.48 |
| Enzyme | .03 |

The process has the added advantage of being much more economical than known processes and can be carried out in less than about one-half of the time heretofore required.

Many widely different embodiments can be made without departing from the spirit and scope of the invention, and it is to be understood that the invention is not restricted except as set forth in the appended claims.

What is claimed:

1. A continuous process of preparing paper coating composition which has on completion a solid content in excess of 50% comprising blending native starch, mineral pigment, and water; continuously flowing the blended composition through a dispersion zone, a heating zone, introducing into the flowing material an enzyme, then flowing the composition in a confined layer and violently agitating the composition passing through a second heating zone to convert the starch therein, and then inactivating the enzyme.

2. The continuous process of preparing paper coating composition having a solids content in excess of 50% which comprises mixing water, starch and mineral pigment to form a slurry, continuously passing the slurry in a thin confined layer through a heating zone to raise the temperature thereof to about but below the gelatinization temperature of the starch contained in the slurry, introducing an enzyme into a flowing stream of the heat slurry, and then passing the slurry in a thin confined layer in a second heating zone to lower the viscosity of the starch contained in the slurry, and then inactivating the enzyme.

3. The continuous process of preparing a paper coating composition, comprising mixing unconverted starch, pigment, and water to form a slurry dispersing the slurry, heating the slurry to raise the temperature not to exceed 160° F., adding an enzyme to the hot slurry, increasing the temperature of the slurry to convert the starch in the slurry and violently agitating the slurry in a confined film while increasing the temperature of the slurry, and then inactivating the enzyme in the composition.

4. In a continuous process of preparing paper coating color comprises forming a slurry containing native starch, flowing the slurry through a heating zone under pressure, adding to the flowing stream an enzyme, flowing the slurry containing the enzyme through a second heating zone in a confined layer, said slurry violently agitated in each heating step, and thereafter inactivating the enzyme.

5. A process of preparing paper coating composition comprising an aqueous slurry containing raw starch, raising the temperature of the slurry to about 135° F. to about 160° F., injecting enzyme into the heated slurry in an amount of about 0.19 to about 1% based upon the weight of the starch in the slurry, flowing the slurry in a confined film through a heating zone where the temperature is increased and violently agitating the slurry in the heating zone and thereafter inactivating the enzyme.

References Cited in the file of this patent

UNITED STATES PATENTS

| 1,667,073 | Kreismann | Apr. 24, 1928 |
| 2,275,845 | Drake | Mar. 10, 1942 |
| 2,302,309 | Glarum et al. | Nov. 17, 1942 |
| 2,394,233 | Craig | Feb. 5, 1946 |
| 2,424,546 | Bauer et al. | July 29, 1947 |
| 2,526,598 | Barrett et al. | Oct. 17, 1950 |